United States Patent [19]

Littrell

[11] 4,338,484
[45] Jul. 6, 1982

[54] CABLE CARRYING FLOOR DUCT APPARATUS

[76] Inventor: Gary L. Littrell, 302 Timbercrest Ct., Schaumburg, Ill. 60193

[21] Appl. No.: 182,642

[22] Filed: Aug. 29, 1980

[51] Int. Cl.³ ............................................. H02G 3/18
[52] U.S. Cl. ...................................... 174/48; 52/221
[58] Field of Search ..................... 174/48, 49, 95, 96, 174/97, 98; 52/220, 221

[56] References Cited

U.S. PATENT DOCUMENTS

| | | | |
|---|---|---|---|
| 3,303,264 | 2/1967 | Saul et al. ........................... | 52/221 X |
| 3,417,191 | 12/1968 | Fork ................................. | 174/96 X |
| 3,426,802 | 2/1969 | Fork ................................. | 174/96 X |
| 3,676,568 | 7/1972 | Fork ................................. | 52/221 X |
| 3,721,051 | 3/1973 | Fork ................................. | 174/49 X |
| 3,751,576 | 8/1973 | Klinkman et al. .................... | 174/48 |
| 4,010,314 | 3/1977 | Kohaut ............................... | 174/48 |

Primary Examiner—B. A. Reynolds
Assistant Examiner—D. A. Tone
Attorney, Agent, or Firm—Lester N. Arnold

[57] ABSTRACT

An improved floor duct apparatus or assembly useful for the housing and routing of power and/or communication lines and cables routed through duct access openings and connectible floor fittings, said apparatus including multiple interior segregated compartments and/or channels defined by cooperating floor, ceiling and side wall sections, the improvement thereof comprising the elevation or depression of selected portions of the ceiling section to define certain ceiling portions inclined with respect to the horizontal plane wherein the access openings therethrough include both vertical and horizontal dimensions providing increased accessibility into the underlying interior channels. Cooperating floor fitting or outlet apparatus includes improved assembly of parts and compartmentalized configuration.

18 Claims, 6 Drawing Figures

CABLE CARRYING FLOOR DUCT APPARATUS

BACKGROUND OF THE INVENTION

This invention relates generally to floor duct apparatus useful for the housing and routing of power and signalling lines and cables generally installed during construction of floors and floor elevations of multi-storied office buildings. More particularly, the invention relates to improved floor duct apparatus comprised of a generally continuous length floor cell structure and a plurality of floor fitting or outlet units.

A novel feature of the improved floor cell structure resides in the selective elevation and/or depression of the lengthwise extending segments of the ceiling section of the four-sided cell structure, thereby defining inclined ceiling segments which provide any access port or opening therethrough with both vertical and horizontal dimensional access. The access ports are of sufficient width to provide direct access to each separable channel or trough of a plurality of divisible channels or troughs within the cell structure. Another novel feature of the invention resides in connectible floor fitting or outlet units or means to be fitted with selected ones of the access ports in complementary manner with the inclined ceiling segments, said outlet units including improved assembly of parts and compartmentalized configuration.

The type of floor duct apparatus of consideration herein has an elongated cell structure generally constructed of formed sheet metal casing configured to present cooperating floor, ceiling and side wall sections or members having a rectangular cross-sectional pattern. The cell structure includes interior wall sections to define interior and segregated or separable channels or troughs extending lengthwise of the cell structure. Access to the interior channels is made through a repeating pattern of access ports or openings (apertures) provided in the ceiling wall section of the cell structure. It is known to utilize the cell structure for housing extended or routed cables and lines useful for electrical transmission or power and/or signalling or communication purposes. The routed cables are readily tapped or connected to or terminated by means of spaced apart floor fittings or outlets mountable to the ceiling section at selected ones of the access ports.

One of the disadvantages of the prior art floor duct apparatus resides in the generally flat-like or non-elevated ceiling member which is usually positioned to line in a horizontal plane. The access ports formed from knock-out areas of the ceiling section, also are disposed in the horizontal plane of the ceiling member. The access ports are desirably made large enough to provide access to all interior channels, but the access to the two outer channels of a typical 3-channel configuration is limited to the entrance through a ceiling surface lying in the horizontal plane. Further, the access port usually only partially extends over the side channels. When a cooperating floor outlet is mated with the access port, any access to the two outer channels of the cell structure is then provided through a central opening in the floor outlet which also lies in the horizontal plane in communication with the matched access port. The crowded conditions caused by the routing of many cables within the cell structure further limits the accessibility through the floor outlet and/or access port. It is an advantage to provide increased accessibility to and from the interior channels of the cell structure through the central opening of a floor outlet without increasing the horizontal width of the cell structure or access port or the base size of the floor outlet.

The novel cell structure of the present invention includes a ceiling section having a centrally disposed segment thereof of lowered horizontal elevation with respect to the raised horizontal elevation of the immediately adjacent oppositely disposed side edge portions of the ceiling section. The continuous ceiling portions which interconnect between the raised side edge portions and the lowered centrally disposed portion of the ceiling section define inclined ceiling portions, and the length of the inclined ceiling portions is directly dependent upon the offset vertical distance (altitude) between the raised and/or lowered ceiling portions, and the angle of the incline (measured from the horizontal plane). It is obvious that the central portion of the ceiling section could be raised with respect to the side edge portions of the ceiling section to also define inclined ceiling portions therebetween.

In the configuration shown and described herein, the central ceiling section is lowered with respect to the side edge portions thereof, and the inclined ceiling portions are defined to lie in planes converging toward the center of the cell structure. The access ports are provided to extend from the lowered central ceiling portion, where access is provided to the central interior channel of the cell structure, to the raised side edge ceiling portions, where the access port overlies to a predetermined degree the side interior channels of the cell structure. It is readily apparent that the access ports in the ceiling section lie in two different horizontal planes and an inclined plane interconnecting the same whereby both vertical and horizontal dimensional access is provided to the interior duct channels. The degree of accessibility and/or maneuverability of cables, lines, etc. through an access port provided in an inclined ceiling wall segment is significantly improved over that provided through an access port in a flat-like ceiling section having no incline for the reason that no significant horizontal component of movement is available through the prior art access openings lying solely in the horizontal plane.

Presently known configurations of floor duct fittings or outlets include base members having central openings or passageways, respectively, which are aligned to be placed in communication with the matched access ports. The access ports and central openings of the floor fittings are known to provide entrance into and from the interior channels of the cell structure, allowing passage therethrough of cables, lines, parts, tools, hands of workmen, etc. However, floor outlets which have base members that are relatively deep, or which do not extensively overlie the outer side channels of the cell structure, or which interconnect with ceiling sections which are disposed in only a single horizontal plane, do not permit the degree of accessibility therethrough into the interior cell channels as is generally needed in the present state of the art wherein more and more cables and lines are needed to be routed through a given cell structure and crowded conditions are commonplace. Further, it is important that the routed cables/lines which are brought into a given floor outlet be segregated and/or shielded from each other in order to eliminate potential electrical interference therebetween. A floor outlet unit is provided herein having increased simplicity of assembly of parts and improved compartmentalization whereby the routed cables/lines can be easily segregated.

The improved floor duct outlet of the present invention includes a base member defining a central opening or passageway of complementary dimension and size to the access port with which the floor outlet shall be interconnected so that the access port and central passageway are in direct alignment and communication. Hence, the base member includes a pair of outer edge base portions disposed in a common horizontal plane, a centrally disposed base portion lying in another horizontal plane, either raised or lowered vertically with respect to the outer edge portions thereof, and interconnecting base portions disposed to lie in inclined planes angled to intersect the other horizontally separated base portions, the planes being inclined toward (converging) the vertical plane for the floor outlet and cell structure. The central passageway of the floor outlet complements the access port and extends simultaneously both horizontally and vertically to provide maximum accessibility into the interior cell channels, especially permitting increased accessibility into the outer side channels thereof without unduly enlarging the width of the access port through the ceiling section of the cell.

An additional disadvantage of prior art cell structure is to provide centered access ports which commonly open into all interior cell channels of a multiple cell channel configuration. In a triple channel configuration, the central channel is commonly utilized as the power channel, that is, the high power carrying cables are routed therein. It is best to provide isolation to this central power channel unless direct access is needed thereto; hence, the access ports of the present cell configuration include a pair of ports directly opening into the side cell channels, but the centrally disposed ceiling wall section includes a pre-punched knockout area which can be removed in those circumstances wherein access is desired to the power channel. The improved floor fitting of the present invention provides for the continued isolation of the routed power line therethrough and provides a double duplex type outlet. It is apparent that some floor outlets will present connections only to signalling or communication lines.

A further disadvantage of the prior art derives from the non-uniformity of floor fittings or outlets wherein a variety of component parts are stock piled on the construction site for installation of several types of floor fittings. The component parts are utilized to provide isolation between power and signalling lines, and also for making a proper fit of different floor fittings to the central access port.

In contrast thereto, the present invention provides an economical, factory installable floor cell and outlet system, custom made to the particular floor duct plans of the building under construction. The improved floor duct cell and outlet system provides improved accessibility through enlarged cell access ports and complementarily enlarged central openings for the floor fittings, improved modular construction for the floor outlets presenting segregated routing therethrough for power cables and signalling lines, double duplex electrical connections at each and every floor outlet unit, and selective knock-out areas in the ceiling member above the power channel in order to isolate or select the power connection as required.

SUMMARY

It is a primary object of the present invention to provide an improved and customized floor duct apparatus and assembled floor duct system including in particular improved cell structure embodiment having an off-set planar ceiling member and enlarged access ports located in the off-set planar portions thereof.

It is another object of the invention to provide a ceiling member for a four-sided duct cell structure having generally raised elevational side edge portions, and a lowered elevational central portion thereof defining inclined segments of the ceiling member therebetween.

It is a further object of the invention to provide the inclined ceiling segments inclining from raised side edge portions to the lowered central portion defining a centrally converging pair of inclined ceiling wall segments.

It is yet another object to provide a spaced-apart plurality of access ceiling ports located in each of the pair of inclined ceiling wall segments.

It is still another object that the access ceiling ports provide access to both interior side channels of a three-channel cell configuration, and the access to the central or third channel remains optional.

It is yet a further object to provide an improved tiered floor outlet featuring improved assembly of parts, compartmentalized configuration and double duplex type connections.

It is an additional object to provide a base tier for the floor outlet which is complementarily configured to match the off-set planar configuration of the ceiling member of the cell structure.

It is still yet another object to provide central openings through the base tiers of the floor outlets, respectively, to coincide with aligned ones of the access ports.

An improved floor duct apparatus or assembly is provided by the present invention, comprising in combination an elongated floor duct cell structure including a ceiling member thereof containing multiple access ports therethrough and having raised and lowered ceiling portions off-set to lie in different parallel planes with respect to each other, the raised and lowered elevational ceiling portions defining therebetween inclined ceiling portions. The access ports are selectively disposed in the raised, lowered and inclined ceiling portions, respectively, to provide direct enhanced access to the multiple interior and partitioned cable passageways within the cell structure. The access ports opening into the more inaccessible side duct channels are disposed to lie in the planes of the raised and inclined ceiling portions, and provide significant vertical and horizontal components of access and direction of movement. A tiered or multi-level floor duct outlet unit is mounted on and interfitted with the cell structure in aligned registry with selected ones of the access ports, and includes a base member including planar off-set raised, lowered and inclined bottom wall portions thereof which complement the planar off-set raised, lowered and inclined ceiling portions of the cell structure, the base member thereof defining a central opening therein which is brought into aligned registry with the access ports of the cell structure. The floor duct outlet unit includes compartmentalized interior parts providing improved channeling of and shielding between routed power and signalling and/or communication lines and cables, and further includes a cap-like outlet member which is installed to be generally flush with floor surface level of a floor substructure which contains the floor duct apparatus, and which outlet member presents a double duplex power outlet configuration.

A novel floor duct outlet for mounting electrical receptacle units is comprised in combination of a base member of generally rectangular open-ended configuration including a pair of end walls and a pair of side walls defining a central opening therebetween, the pair of side walls diverging downwardly and outwardly to provide a downwardly increasing central opening, said end walls and side walls further defining a bottom edge wall disposed in offset horizontal planes, said bottom edge wall having oppositely disposed outer edge portions thereof lying in a first horizontal plane and a centrally disposed portion thereof lying in a second horizontal plane offset downwardly from the first horizontal plane, and intermediately disposed bottom edge wall portions lying in inwardly converging inclined planes intersecting with the first and second horizontal planes, and an interiorly mounted divider plate assembly including in combination a lower apertured divider plate having a central enlarged aperture and a laterally offset aperture, and a top apertured divider plate having a pair of spaced receptacle-receiving enclosure members and a narrowed bridge member interconnecting the same, one of said enclosure members defining in the bottom wall thereof a first aperture disposed to align with the laterally offset aperture of the lower divider plate with pivotal movement of the top divider plate toward the lower divider plate, and said centrally enlarged aperture of the lower divider plate being disposed to overlie and align with the central opening of the base member for providing increased access therethrough with a pivotal movement of the top divider plate away from the lower divider plate, and a cap member engageable with the base member and having an apertured top wall including a plurality of apertures therethrough for receiving aligned connector portions of said receptacle units, the removal of the cap member enabling the pivotal movement of the top divider plate away from the lower divider plate for yielding access to the enlarged aperture thereof.

An improved cable duct apparatus includes in combination: a floor cell structure having a ceiling member and multiple apertured access ports provided through the ceiling member for opening into the interior of the cell structure, and a floor outlet unit connected to the ceiling member in aligned registry with a selected apertured access port, the improvement comprising planar off-set ceiling portions for the ceiling member defining therebetween inclined ceiling portions, each of the apertured access ports opening through the inclined ceiling portions and through a selected one of the planar off-set ceiling portions, and planar off-set bottom wall portions for the floor outlet unit defining therebetween inclined bottom wall portions for interfitting with the planar off-set portions of the ceiling member, and a central opening defined by the floor outlet unit aligned in registry with the selected access port.

These and other objects and advantages of the invention will become apparent and obvious to those skilled in the pertinent art upon referring to the following description provided in connection with the accompanying drawing, of which:

DETAILED DESCRIPTION

Figure 1:
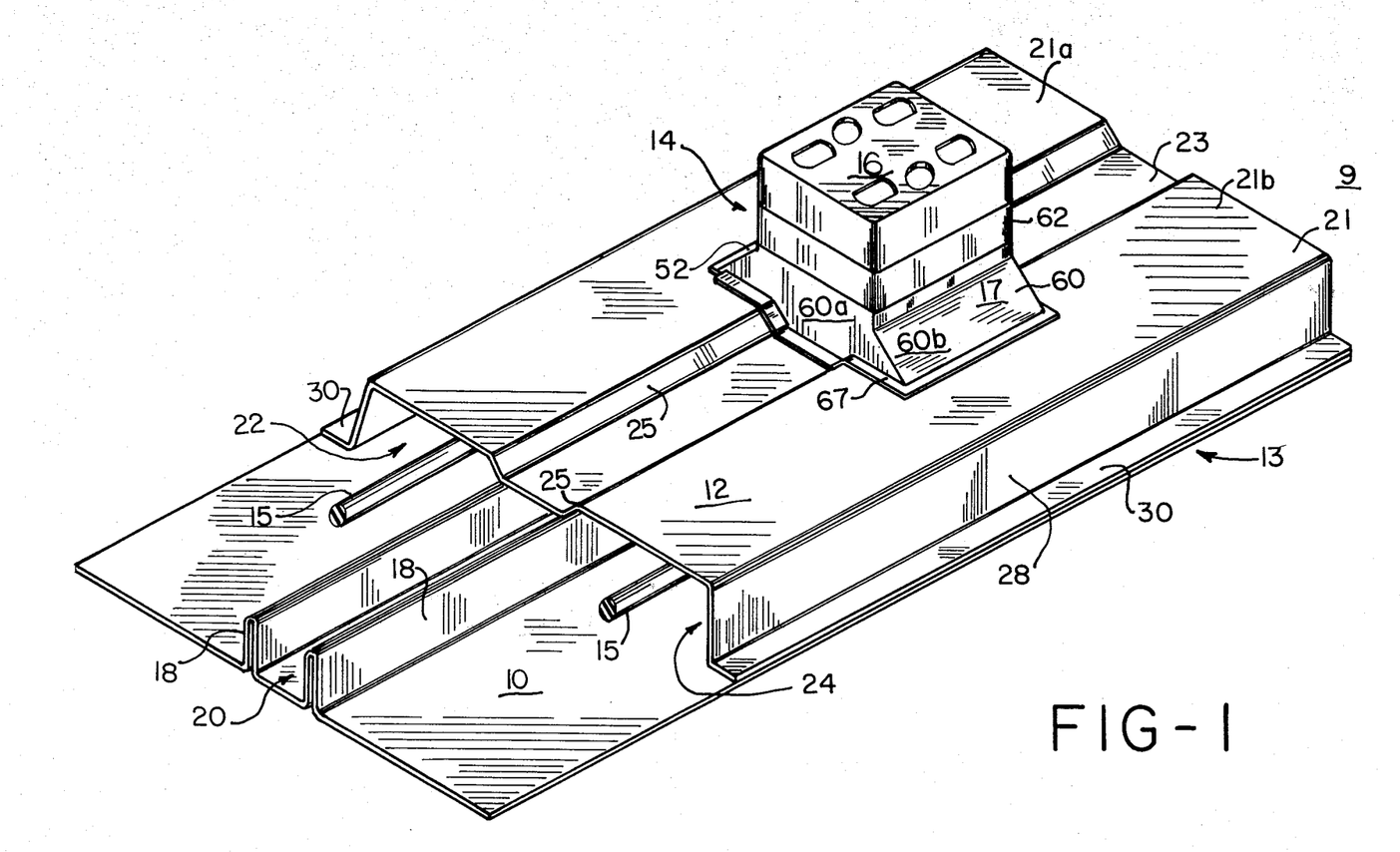
FIG. 1 is a frontal perspective view of the floor duct assembly constructed in accordance with the present invention, showing both a novel floor duct cell structure and an interconnected floor outlet unit.

There is shown in FIG. 1 a floor duct apparatus or assembly 9 having a lowermost or bottom floor member 10 and a complementarily fitting uppermost or top ceiling member 12, comprising when joined together a four-sided duct or cell structure 13 of a type useful for the housing of routed power and/or communication lines and cables such as are indicated by cable fragments 15 of FIG. 1. The floor cell structure 13 is normally accompanied by a plurality of floor outlet or floor fitting means 14 spaced along the extended lengths of the cell structure 13. Each of the floor outlet means 14 is comprised of a topmost or upper outlet member 16 and a bottom most or lower outlet member 17. It is generally understood that the aforementioned floor duct apparatus 9 is installable with the cell structure 13 placed beneath surface levels in the floors and floor elevations of multi-storied office buildings. The upper outlet member 16 remains accessible near floor surface levels for the convenient routing of power and/or communication and/or signalling lines and cables to and from selected ones of the floor outlets 14 through the passageways and/or channels of the cell structure 13.

The interior space of the cell structure 13 is compartmentalized or divisible into separated channels or passageways which extend lengthwise with the extended length dimension of the cell structure 13. A pair of interior wall partitions or segments 18 extend parallel and spaced apart with respect to each other and divide the interior space or area of the cell structure 13 into a three-channel spacial configuration comprised of a central or middle channel or trough 20 and a pair of outer or side channels or troughs 22 and 24, respectively. It is typically common practice to deploy or lay electrical power and high voltage cables within the middle channel 20 for routing of electrical power, and to accommodate communication and/or signalling type lines or cables, indicated at 15 in FIG. 1, in the outer pairs of channels 22 and 24. There are normally a large number of signalling lines deposited in the side channels 22 and 24 in comparison to the number of power lines disposed or placed in the central channel 20, and for this reason, it is convenient to provide that the side channels 22 and 24 are somewhat larger in width or traverse dimension than is the central channel 20. It is important to electrically isolate any power cables (not shown) from any communication or signalling lines in order to prevent undesired electrical interference therebetween. The interior wall segments 18 are conveniently defined or formed from contouring the relatively flat-like floor member 10.

Figure 2:
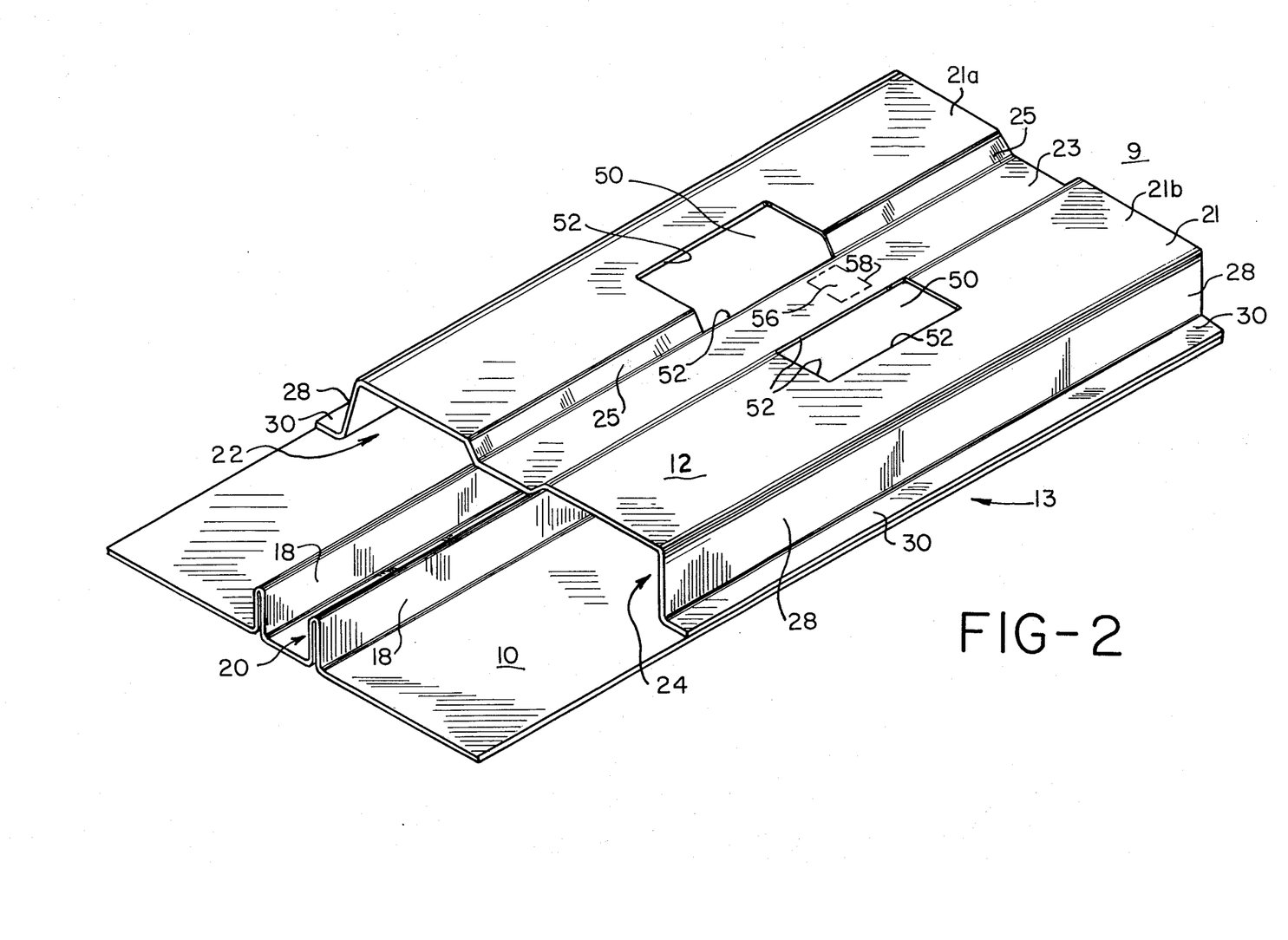
FIG. 2 is a frontal perspective view of the floor duct cell structure of FIG. 1 with the floor outlet unit omitted for showing particular novel feature of access ports.

Referring to FIGS. 1 and 2, the ceiling member 12 of the present invention is contoured from flat-like metal stock to provide a raised elevational upper surface 21 having a lowered elevational central portion thereof 23. The lowered ceiling wall segment or surface 23 divides or separates the raised elevational and coplanar ceiling areas to provide a pair of spaced-apart side or edge portions 21a and 21b. In combination, the ceiling segments 21a and 23, 21b and 23 define between them, a pair of inclined ceiling wall segments or surfaces 25 converging in an inwardly and downwardly direction toward projected intersection with each other, as shown in FIGS. 1 and 2. The ceiling member 12 includes outer side walls 28 ending in outwardly turned flange or lip elements 30, respectively, which are extendable in parallel with the flat-like edge extremities of the bottom floor member 10. The lip elements 30 are formed along the lower extremity of the side walls 28 for facilitating the attachment of the ceiling member 12 to the floor member 10. During factory assembly thereof, the lip elements 30 may be secured by welds or rivets or other fastener means to provide a rigid seamed formation securing the desired four-sided enclosure or housing means for the cell structure 13.

The outer channels or passageways 22 and 24 are defined by an associated one of the lower inner walls 18, the relatively taller outer walls 28, the floor member 10 and the combination of raised ceiling member 21a with inclined ceiling member 25, and the ceiling members 21b and 25, respectively. The inner or central channel or passageway 20 is bounded by the pair of spaced lower inner walls 18, the floor member 10 and the lowered central portion 23 of the upper surface 21 of the ceiling member 12. The inner walls 18 are extended in their height dimension in order to contact the central portion 23 of the ceiling member 12, as clearly shown in FIG. 3. It is an aspect of the invention to provide that the central and lowered elevational portion 23 of the ceiling member 12 be lowered proximate to said inner walls 18 of the floor member 10, and the width of the central ceiling portion be relatively flat-like between the inner walls 18 to define the top wall of the interior channel 20.

Figure 3:
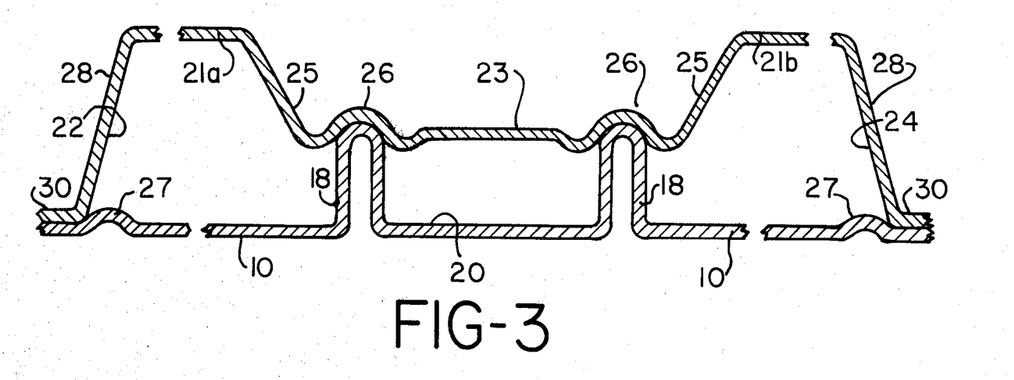
FIG. 3 is a fragmentary or broken end view of the cell structure of FIG. 2 showing detailed contours of the cell structure.

The three interior cable carrying channels 20, 22 and 24 are desirably isolated from each other in order to protect against potential electrical interference between the power cables and/or signalling and communication lines. FIG. 3 shows the ceiling member 12 to include raised cap-like contoured members 26 located in the lowered ceiling portion 23. The upper extremities of the inner walls 18 are complementarily engageable with the cap members 26 to comprise sealing means between inner and outer channels 20 to 22 and 20 to 24. The floor member 10 includes raised cap-like contoured members 27 along the outer edge extremities thereof, which cap members 27 comprise sealing means at the intersection of the outer walls 28 with the floor member 10. The cap members 26 and 27 are merely suggestive of an embodiment of means for sealing the three channels of the cell structure 13, and other equally suitable and equivalent sealing means could be used and/or provided. Further, the raised side edge portions 21a and 21b of the ceiling member 12 lie in a common or the same horizontal plane, and the lowered central portion 23 of the ceiling member 12 lies in a different or off-set horizontal plane so that the ceiling member 12 is said to present a planar off-set planar configuration.

The relative off-set dimensions between each of the raised ceiling portions 21a and 21b and the lowered ceiling portions 23 are a variable item determined by the required spacial capacities for the interior channels 20, 22 and 24. The particular angles, as measured from the horizontal plane of the lowered ceiling surface 23 as are defined by the two inclined ceiling members 28, are also a variable, and are not intended to define an optimum angle of incline. It is intended that the present invention include a wide variety of different angles of incline and off-set planar dimensions, as well as widths and lengths of the cell structure 13, and variations between relative widths of interior channels 20, 22 and 24.

Figure 4:
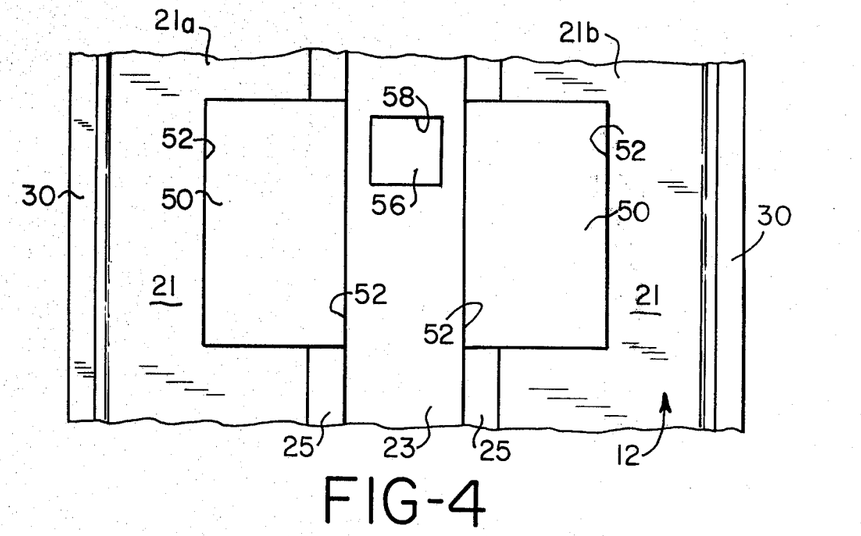
FIG. 4 is an isolated partial top view of the cell structure of FIG. 2 and showing the access ports thereof.

FIGS. 2 and 4 show a pair of apertures or openings providing access through the ceiling member 12 to the underlying interior channels of the cell structure 13, which openings are conveniently referred to herein as access ports or openings 50 defined by cut edge portions 52 of the ceiling member 12. It is in accordance with the present invention that the cut edge portions 52 extend through the raised side edge portions 21a and 21b of the upper surface 21 as well as through the inclined ceiling segments 25. The pair of access openings 50 are divided or separated by the lowered ceiling segment 23 in the preferred embodiment of the invention in order to conveniently isolate the accessibility to the power line carrying central channel 20.

In order to provide access to the central channel 20, the ceiling wall segment 23 is partially pre-cut or punched in a desired pattern as shown at 58 to define an available separate and somewhat smaller access port 56. The ceiling material contained within the partially pre-cut pattern 58 comprises a knock-out plug, which pattern is normally provided at each and every spaced location of the access openings 50. The plugged ceiling material can be selectively removed to define the access port 56 when direct access is desired in and to the central power channel 10. Alternatively, the cut edge portions 52 of the ceiling member 12 could also extend across the central ceiling segment 23 to define a single enlarged access port 50, but the equivalent electrical isolation for the power channel 20 would have to be provided by separate barriers or partitions connectible within the opening of the access port 50. It is the intention of the applicant to include both such concepts within the scope and spirit of the present invention.

In contrast to providing an access opening contained within a ceiling surface disposed entirely within a single horizontal plane, the access ports 50 provide an increased dimensional access to the interior and underlying outer channels 22 and 24. That is, any access opening in a coplanar ceiling surface would provide access or movement therethrough having primarily a vertical component of movement or direction and very little or limited horizontal component of movement or direction. Of course, the element of horizontal direction would increase with the increased size or surface area of the access opening 50, but the cell structures 13 cannot be of unlimited dimension and the access ports 50 must be proportional thereto and remain covered by standard size floor fittings. It is deemed a novel feature of the present invention to provide the inclined ceiling wall segments 25 which can be apertured to enhance the horizontal component of movement or direction into the interior side channels 22 and 24, and without having to increase the width or length of the access ports 50 over that of other access ports as provided in state-of-the-art coplanar ceiling members of standard floor cell structures.

Figure 5:
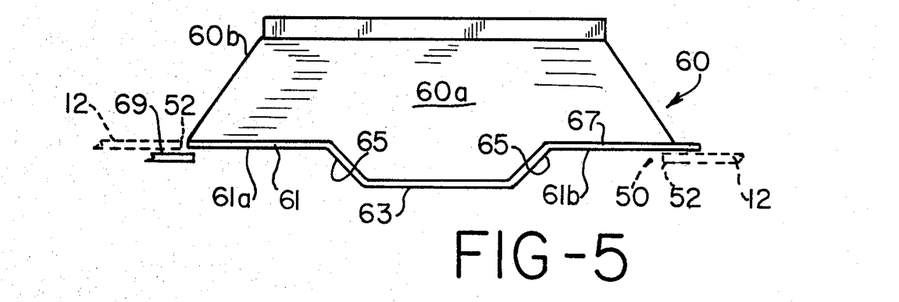
FIG. 5 is an isolated elevational side view of a selected base portion of the floor outlet unit, showing in dashed lines its manner of attachment to the ceiling member of the cell structure of FIG. 2.

In accordance with a further aspect of the invention, the floor outlet or fitting means 14 of FIG. 1 includes improvements in both assembly of parts, compartmentalization and enhanced accessibility to aligned cell access ports as well as the presentation of a double duplex outlet configuration. The improved floor outlet means 14 is comprised in combination of a base or lower insert housing member 60, an intermediate housing spacer member 62 which is optional, and the upper outlet cover member 16. The previously recited lower outlet member 17 is comprised of the base insert member 60 and the intermediate spacer member 62. FIG. 5 shows a bottom wall portion 61 of the base member 60 to be arranged to define a complementary configuration to the off-set planar configuration of the ceiling member 12 for the cell structure 13. That is, there are provided a pair of coplanar side or edge bottom wall portions 61a and 61b and a lowered and planar off-set central bottom wall portion 63 which define between them a pair of inclined bottom wall portions 65. The angle of incline and the dimensions of parts are intended to be entirely complementary to the contoured ceiling member 12 so that the floor fitting 14 interfits with the cell structure 13 to form in combination the floor duct apparatus or assembly 9. Suitable gasket means may be provided between the bottom wall portion 61 and the ceiling member 12 so that no disadvantage of non-conforming interfit is realized from the provision of ceiling contours 26, or other equally suitable and equivalent provisions may be employed to assure relatively good conforming interfit between the cell structure 13 and the floor outlet unit 14.

The base housing member 60 includes a peripheral flange or lip member 67 extending outwardly from the bottom surface 61 thereof, which flange 67 extends from at least three (3) sides of the base member 60, and a separate planar off-set flange or lip member 69 extends from a selected side edge portion for use in fitting and securing the floor fitting 14 to the cell structure 13. For example, the flange 69 is inserted through the aligned access port 50 to be disposed directly beneath the ceiling member 12 adjacent to the cut edge portion 52 as shown in FIGS. 1 and 5. The base member 60 of the floor outlet 14 is thus hinged to the ceiling member 12 and sits directly above and in communicating registered alignment with, the pair of access ports 50 of FIG. 2. The opposite flange portion 67 is then securable to the ceiling member 12, as by rivets (not shown) to provide a stabilized base member 60 upon which to mount the outlet cover 16.

Figure 6:
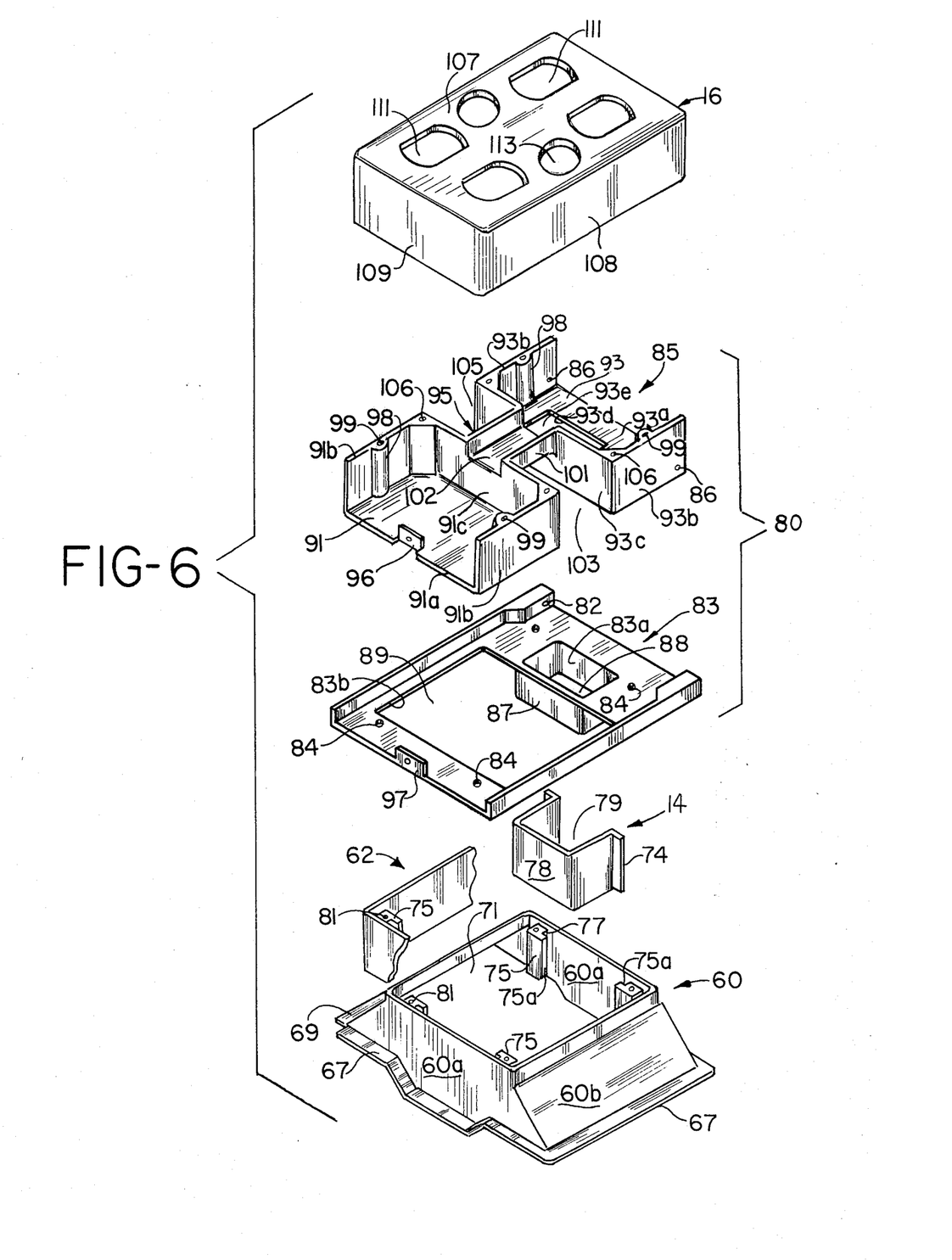
FIG. 6 is an exploded perspective and generally enlarged view of the floor outlet unit constructed in accordance with the invention.

As shown in FIG. 6, the base member 60 includes a pair of side walls 60a and a pair of inclined end walls 60b defining a centrally disposed channel opening 71 which increases in its spacial area proceeding from top to bottom in accordance with the angle of incline of the end walls 60b. The bottom surface 61 of the base member 60 is enlarged to cover the entire ceiling area disposed between the cut edge portions 52 of the ceiling members 21a and 21b of the cell structure 13, bringing the defined channel opening 71 into direct alignment and registry with the pair of access ports 50, and hence, the interior channels 22 and 24 of the cell structure 13. With the base member 60 secured to the cell structure 13, the interiorly disposed cables and lines are selectively routed into and out of the proper interior channels 22 and 24 via the channel opening 71 and the access ports 50, or to and from the interior channel 20 via the channel opening 71 and access port 56.

The base member 60 further includes a pair of spaced guide post members 75 secured to and extending vertically with respect to the inner surfaces of the side walls 60a, respectively, each of the guide post members 75 including a laterally extending tine or shoulder portion 75a protruding therefrom in parallel spaced relationship to the side wall 60a, hence defining therebetween an open groove or track 77. A U-shaped bracket or partition member 78 includes protrusions or ears 74 located on the outer extremities of the leg portions thereof, which ears are insertable into a pair of grooves 77 to hold the bracket 78 against the base member 60 within the channel opening 71. The bracket 78 and the side wall 60a cooperate to define a separate passageway 79 segregated and shielded from the channel opening 71. The partition means or bracket 78 is functional to isolate any power lines and/or cables routed from the access port 56 and through the passageway 79, thus eliminating electrical interference with any signalling lines routed from the access ports 50 into the adjacent channel opening 71. There is sufficient area within the channel opening 71 to provide a pair of the brackets 78, if it shall be desired to provide a pair of the power access ports 56 with each floor outlet 14.

The intermediate spacer member 62 is optionally provided as a vertical extension of the aligned side walls 60a and end walls 60b wherein the depth of the cell structure 13 beneath the floor surface level requires such vertical extension in order to properly elevate the outlet cover member 16 to be generally flush with floor surface level. The spacer member 62 is configured to be a generally rectangular framework and serves as a walled or framed extension of the member 60, defining an extension of the central channel opening 71. Only a fragment of the rectangular framed spacer 62 is shown in the exploded view of FIG. 6, but the spacer member 62 is also shown in FIG. 1. The spacer member 62 includes additional pairs of guide post members 75 which are to be placed in vertical alignment and registry with the lower guide post members 75 of the base member 60. It is readily apparent that an additional bracket 78 may be attached interior to the spacer member 62 in alignment with the lower bracket 78 thereby continuing the extension of the power line passageway 79. The guide post members 75 are provided with suitable apertures 81 which accommodate selected fastener means (not shown) which are used to secure the spacer member 62 to the base member 60.

The floor fitting 14 further includes a base floor plate assembly 80 intended to be mounted interiorly to the cap member 16, which plate assembly 80 is comprised of a lower or base floor plate 83 and a top divider plate 85. The plate 85 is to be pivotally mounted to the base floor plate 83 by suitable pins (not shown) which are insertable into proper apertures 82 of the lower plate 83 and extend into alignable apertures 86 located in the top divider plate 85, as are shown in FIG. 6.

It is a novel feature of the present invention that the top divider plate 85 is pivotally connected by one of its end portions to the underlying divider plate 83 in order to provide hand access through the floor plate assembly 80 after removal of the cap member 16, without removal of the floor plate assembly and by affecting the pivotal movement of the top divider plate 85 away from the lower divider plate 83.

The lower plate 83 is to be stacked on the spacer member 62 or directly on the base member 60, and is to be attached thereto by suitable fastener means (not shown) being received through suitable apertures 84 provided in the lower plate 83 and then extended for insertion within properly threaded apertures 81 located in the guide posts 75.

The lower divider plate 83 is apertured and includes a laterally offset or side opening 88 and an extended collar portion or member 87 formed or defined by edge walls 83a. The extended collar member 87 frames the opening 88 and depends downwardly therefrom, as shown in FIG. 6, defining a channel-like extension of the opening 88. The channel opening 88 is then aligned in registry with the power line passageway 79. The collar member 87 may be extended downwardly to the extent to be telescopically received within the upper portions of the power associated channel 79. The lower divider plate 83 is relatively flat and has a framelike configuration, and further includes an enlarged central opening 89 defined therein by encircling edge portions 83b. With the lower divider plate 83 engaged on the spacer member 62 or the base member 60, the enlarged central opening 89 is then aligned with and provides communication with the channel opening 71 of the floor outlet 14. The signalling and/or communication lines are to be routed from the interior duct channels 22 and 24 through the floor outlet channel openings 71 and 89.

The top divider plate 85 is comprised of a pair of spaced apart or divided open-face receptacle-receiving enclosure members 91 and 93 which are interconnected at the upper extremities by a narrowed bridge member 95. The open-face enclosure members 91 and 93 are defined by bottom walls 91a and 93a, a pair of side walls 91b and 93b, and rear walls 91c and 93c, respectively. The bottom wall 93a is generally cut away along edge portions 93d to define an opening or aperture 93e therein. The opening 93e is to be aligned for direct registry with the power line associated channels 88 and 79 when the top divider plate 85 is pivotally moved toward its normal at rest position on the lower divider plate 83. The bottom wall 91a is provided with a raised apertured shoulder tab 96 which is to be positioned directly behind a similar raised apertured shoulder tab 97 on the lower divider plate 83 with the top divider plate 85 being pivoted into an at rest and stationary position on the lower divider plate 83. A pair of side mounted shoulder bosses or posts 98 are provided to extend vertically on each of the side walls 91b and 93b, respectively. The posts 98 contain proper threaded apertures 99, and are conveniently located along central portions of the side walls 91b and 93b, respectively.

The narrowed bridge member 95 which connects or extends between the enclosure members 91 and 93 is open at the top thereof and is comprised of a pair of side walls 101 and a bottom wall 102. The narrowed width dimension of the bridge member 95 (as compared to the width dimension of the enclosures 91 and 93) in combination with the rear walls 91c and 93c, form or define a pair of central channel openings 103 and 105 which are to be aligned with the underlying signalling-associated central opening 89. The open spacial areas of the enclosure members 91 and 93 are intended to receive standard electrical receptacle units (not shown) of the double female-type jack or connector configuration, respectively. The receptacle units would extend between and would be secured to the shoulder posts 98 by fastener means (not shown) receivable within the threaded apertures 99.

Such electrical connectors are to be utilized for providing power line plug-in type connections in association with the power lines being routed through the floor duct apparatus 9. A typical routing of a power line would be to come from the power associated interior duct channel 20 of the cell structure 13, through the duct access port 56, the channel openings 79 and 88, and the opening 93e and then to be connected to the standard double type electrical connector which would be selectively mounted in either the enclosure member 91 or enclosure member 93. For example, the routed power line (not shown) could also be routed across the narrowed bridge 95 and connected to a standard double type electrical connector as would be mounted in the enclosure member 91 to provide a so-called double duplex electrical power outlet arrangement. The bridged power line is seen to be channeled and shielded from the signalling lines by the provision of the side walls 101 in cooperation with the bottom wall 102 of the bridge 95.

Suitable plug-in type jacks or connectors (not shown) of single plug-in capacity are to be positioned in the central channels 103 and 105, and such connectors are to be secured to the receptacle units 91 and 93 by suitable fastener means (not shown) to be received within apertures 106. These single capacity jacks are intended for use to interconnect the signalling and/or communication lines which are to be brought from the cell structure 13 as follows: from the interior duct channels 22 and/or 24 through the duct access ports 50, floor fitting channel opening 71, lower divider plate opening 89 and into the central channel openings 103 and 105 for connection to any installed jacks.

The upper outlet cap or cover member 16 is shown in exploded perspective view in FIG. 6, and includes a top apertured wall 107, a pair of side walls 108 and a pair of end walls 109, only one of each pair of the walls 108 and 109 being shown therein. The outlet cover 16 is open on its underside for being inserted in cap-like fashion over the underlying and aligned top divider plate 85. The outlet cover 16 is provided with two sets of power associated outlet apertures 111, and a centrally disposed pair of signalling associated outlet apertures 113. With the outlet cover member 16 in proper assembled position, the apertures 111 and 113 are brought into aligned registry with the connector inlet plugs of the power associated and signalling associated connectors, respectively.

With the cap 16 being removed from its assembled position on the floor fitting 14, the top divider plate 85 is exposed, and can be pivoted with respect to the lower divider plate 83. As the top divider plate 85 is pivoted upwardly away from the lower divider plate 83, the enlarged central opening 89 is exposed for yielding direct hand access to the interior confines of the underlying cell structure 13, as through openings 89, 71 and the access ports 50. Improved accessibility to the interior duct compartments 22 and 24 is provided by the enlargement of the central opening 71 as provided by the slanting of the end walls 60b in combination with the novel feature of the access ports 50 having both vertical and horizontal dimensions provided by the inclined ceiling wall segments 25.

The floor fitting 14 is understood to be installed to the cell structure 13 in hinged registry with predetermined ones of the duct access ports 50 and the installed fittings are spaced along the extended cell structure 13 in association with the multiple duct access ports 50. The floor outlet cover 16 is installed to be generally flush with the floor surface level, and the remainder of the floor duct assembly 9 lies beneath the floor surface level, interior to the substructure thereof. The materials to be used and the method of manufacturing the floor duct apparatus 9 are state-of-the-art and generally known, except to state that the design disclosed herein is compatible with modern metal forming processes, such as metal rolling or folding techniques. The cutout or knock-out patterns may be cut by factory equipment according to customized specifications, and then easily removed at job site. It is readily apparent that the access ports 50 could be opened at the job site by removal of pre-cut patterns. The use of the floor fittings 14 eliminates the need for several types of floor fittings at the job site, that is, separate power and signalling outlets, and uses of separate dividers and plates to be positioned within the floor fittings and cell structure to provide channeling of and shielding between power and communication lines and cables.

In accordance with the foregoing, it is apparent to one skilled in the art that the present invention provides a novel improvement in the art of floor duct apparatus. Increased accessibility to the duct and customized floor fittings are provided in a design which is economical to manufacture and install at construction sites. Increased horizontal components of access to interior duct channels through access ports made in inclined ceiling segments provides much improved duct channel accessibility, while the improved floor fittings permit ready isolation and shielding of the power cables and provide a double duplex outlet for power connections.

What is claimed is:

1. An improved cable carrying floor duct apparatus comprising in combination: an elongated floor cell structure including a ceiling member, side walls and a bottom wall defining a four-sided housing enclosure, interior walls defining multiple interior compartments extending lengthwise within the cell structure, the ceiling member having multiple apertured access ports therethrough providing access to the interior compartments and being selectively spaced along the elongated length thereof, and the ceiling member further having planar offset ceiling portions extending lengthwise thereof and inclined ceiling portion which interconnect between the planar offset ceiling portions, each of the spaced-apart multiple access ports being opened through a planar offset ceiling portion and an adjacently disposed inclined ceiling portion for providing a multiple planar access port, and multiple floor outlet units to be connected to and disposed upon the ceiling member of the floor cell structure in registered alignment with selected ones of the multiple access ports, respectively, each of the outlet units having planar offset bottom wall portions and inclined bottom wall portions interconnecting therebetween and extending complementarily with the planar offset ceiling portions and inclined ceiling portions, respectively, with the floor outlet unit being in aligned registry with the selected access port, and further having a central opening defined therethrough which aligns with the selected access port for providing access therethrough into the communicating interior compartment of the floor cell structure.

2. An improved floor duct apparatus as claimed in claim 1 wherein the planar offset ceiling portions include first ceiling portions disposed to extend within a first plane and a second ceiling portion disposed to lie within a second plane offset with respect to the first plane and extending parallel with respect thereto, and the inclined ceiling portions are disposed to extend between the first and second ceiling portions in centrally directed converging planes.

3. An improved floor duct apparatus as claimed in claim 2 wherein the second ceiling portion is lowered with respect to the first ceiling portions and is disposed generally centrally of the ceiling member.

4. An improved floor duct apparatus as claimed in claim 3 wherein the access ports are provided in oppositely disposed pairs thereof extending through oppositely disposed inclined ceiling portions and adjacent first ceiling portions.

5. An improved floor duct apparatus as claimed in claim 4 wherein a further access port is provided in the second ceiling portion generally between the oppositely disposed pairs of access ports in the inclined ceiling portions.

6. An improved floor duct apparatus as claimed in claim 5 wherein the floor cell structure includes three interior compartments defined by a pair of spaced interior walls, said pair of interior walls are provided proximate to said centrally disposed second ceiling portion and define a central compartment therebetween with two outer compartments disposed oppositely thereof, each pair of oppositely disposed access ports as provided in the inclined ceiling portions and adjacent first ceiling portions define openings into the two outer compartments of the cell structure, respectively, and each of the access ports in the second ceiling portion defines an opening into the central compartment.

7. An improved floor duct apparatus as claimed in claim 2 wherein each of the floor outlet units includes a base member defining said central opening therethrough, and including said planar offset bottom wall portions and said inclined bottom wall portions being interconnected therebetween, said planar offset bottom wall portions including first bottom wall portions disposed to extend within a first plane and a second bottom wall portion disposed to extend within an offset and parallel second plane, and said inclined bottom wall portions are disposed to extend between the first and second bottom wall portions in centrally directed converging planes.

8. An improved floor duct apparatus as claimed in claim 7 wherein each of the floor outlet units includes a cap member engageable with the base member and having an apertured top wall including a plurality of apertures therethrough for receiving aligned connector portions of electrical receptacle units, and further including an interiorly mounted divider plate assembly comprising the combination of a first apertured divider plate member having a central enlarged aperture defined therethrough and disposed in aligned registry with the central opening of the base member and the aligned access port, and a second apertured divider plate member to be mounted on the first divider plate member and having one end portion thereof pivotally connected to an adjacently disposed end portion of the first divider plate member for pivotally moving the second divider plate member with respect to the first divider plate member with the cap member removed from the base member of the floor outlet, said pivot movement of the second divider plate member exposing the central enlarged aperture of the first divider plate member for providing access therethrough into the central opening of the base member of the floor outlet unit and then into the interior compartments of the cell structure through the aligned ceiling access ports.

9. An improved floor duct apparatus as claimed in claim 8 wherein the base member includes partition means to be attached thereto within the central opening thereof, which partition means defines a channel opening therethrough within the central opening of the base member, the first divider plate member further includes a laterally offset aperture defined therethrough and being disposed in aligned registry with the channel opening defined by the partition means, and the second divider plate member includes a bottom wall opening defined therein and being disposed in aligned registry with the laterally offset aperture of the first divider plate member with the second divider plate member pivoted to engage the first divider plate member.

10. An improved floor duct apparatus as claimed in claim 9 wherein the second divider plate member includes a pair of spaced enclosure members and a narrowed bridge member extending therebetween to interconnect the pair of enclosure members, each of the enclosure members having an end wall, a pair of side walls and a bottom wall defining an interior enclosure space for receiving therein an electrical power-type receptacle unit, and the bridge member having a bottom wall and a pair of side walls defining a channel opening for receiving a power line therein interconnecting between the pair of receptacle units to be mounted in the pair of enclosure members, respectively, whereby the power-type receptacle units and interconnecting power line are electrically isolated, and a selected one of the enclosure members includes the aligned bottom wall opening for routing therethrough power-type cable means.

11. An improved floor duct apparatus as claimed in claim 10 wherein the side walls of the bridge member in cooperation with the spaced end walls of the pair of enclosure members define a pair of laterally disposed outer channel openings extending through the second divider plate member and receiving therein electrical signalling-type receptacle units, respectively, whereby the signalling-type receptacle units are electrically isolated, and the outer channel openings are disposed in aligned registry with the central enlarged opening of the first divider plate member for routing therethrough signalling-type cable means.

12. A novel floor duct outlet for mounting and isolating electrical receptacle units and useful with cablecarrying floor duct apparatus, comprising the combination of a base member of generally rectangular open-ended configuration including a pair of end walls and a pair of side walls defining a central opening therebetween, the pair of side walls diverging downwardly and outwardly to provide a downwardly increasing central opening, the end walls and side walls in combination further defining a bottom edge, portions thereof being disposed in offset horizontal planes, said bottom edge having oppositely disposed outer edge portions thereof lying in a first horizontal plane and a centrally disposed portion thereof lying in a second horizontal plane offset downwardly with respect to the first horizontal plane, and having intermediately disposed bottom edge portions lying in inwardly converging inclined planes intersecting with the first and second horizontal planes, and further having an interiorly mounted divider plate assembly including in combination a lower apertured divider plate having a central enlarged aperture and a laterally offset aperture, and a top apertured divider plate having a pair of spaced apart receptacle-receiving enclosure members and a narrowed bridge member interconnecting the same, one of said enclosure members defining in the bottom wall thereof a first aperture disposed to align with the laterally offset aperture of the lower divider plate with pivotal movement of the top divider plate toward the lower divider plate, and said centrally enlarged aperture of the lower divider plate being disposed to overlie and align with the central opening of the base member for providing increased access therethrough with pivotal movement of the top divider plate away from the lower divider plate, and a cap member engageable with the base member and having an apertured top wall including a plurality of apertures therethrough for receiving aligned connector portions of said receptacle units, the cap member when removed allowing the pivotal movement of the top divider plate away from the lower divider plate for exposing the enlarged aperture thereof.

13. An improved cable carrying floor duct comprising: a planar floor member having parallel inner walls protruding therefrom and defining inner and outer channels thereon; a cap member having a pair of spaced-apart side walls disposed in substantial parallel alignment with said inner walls and being connected to said floor member, said side walls defining a ceiling portion therebetween, and said ceiling portion including an offset elevational portion providing inclined ceiling portions disposed proximate to the inner walls, respectively, said inclined ceiling portions being located in the ceiling portion entirely over said outer channels, and further including access openings in the ceiling spanning said inclined portions for providing horizontal access solely to the outer channels.

14. The improved floor duct of claim 13 wherein inclined portions extend longitudinally the length of the floor duct in substantial parallel orientation with said inner walls.

15. The improved floor duct of claim 14 further comprising a knock-out opening interposed in said ceiling between said parallel inner walls to provide vertical access to said inner channel.

16. An improved cable duct assembly comprising: a planar floor member having parallel inner walls protruding therefrom and defining inner and outer channels thereon; a cap member having side walls protruding therefrom in parallel orientation to said inner walls and defining a ceiling portion therebetween, said cap member being rigidly affixed to said floor member along the lower extremity of said side walls, and said ceiling portion including inwardly facing inclined ceiling portions disposed proximate to said inner walls, multiple access openings spanning said inclined portions; and said duct assembly further comprising an insert base member rigidly affixed to said ceiling portion in vertical registration with selected ones of said access openings for providing mounting means for cable outlets, and knock-out openings in said ceiling portion lying intermediately of said access openings, and being placed in vertical registration with said insert base member.

17. The improved floor duct of claim 16 further comprising isolating channeling means affixed to said insert base member in vertical registration with said knock-out opening for shielding cables channeled through said knock-out opening.

18. The improved floor duct of claim 17 further comprising cable distribution means affixed to said insert base member having a bridge portion therein for distributing cable across its interior while maintaining shielding of cables, and having multiple aligned apertures therein providing routing of cables.

* * * * *